(12) United States Patent
Willshire

(10) Patent No.: US 10,873,546 B2
(45) Date of Patent: Dec. 22, 2020

(54) SYSTEM AND METHOD FOR AUTOMATED CONTACT CENTER AGENT WORKSTATION TESTING

(71) Applicant: Cyara Solutions Pty Ltd, Melbourne (AU)

(72) Inventor: Geoff Willshire, Yeronga (AU)

(73) Assignee: Cyara Solutions Pty Ltd, Melbourne (AU)

( * ) Notice: Subject to any disclaimer, the term of this patent is extended or adjusted under 35 U.S.C. 154(b) by 0 days.

(21) Appl. No.: 16/392,504

(22) Filed: Apr. 23, 2019

(65) Prior Publication Data

US 2019/0372919 A1 Dec. 5, 2019

Related U.S. Application Data

(63) Continuation of application No. 15/613,168, filed on Jun. 3, 2017, now Pat. No. 10,367,764, and a
(Continued)

(51) Int. Cl.
| | |
|---|---|
| *H04M 3/51* | (2006.01) |
| *H04M 3/28* | (2006.01) |
| *H04M 7/00* | (2006.01) |
| *H04L 12/46* | (2006.01) |
| *G06F 11/36* | (2006.01) |
| *H04L 12/58* | (2006.01) |
| *H04L 12/26* | (2006.01) |
| *H04L 12/24* | (2006.01) |
| *H04L 29/08* | (2006.01) |

(52) U.S. Cl.
CPC ........ *H04L 51/046* (2013.01); *G06F 11/3664* (2013.01); *H04L 12/4625* (2013.01); *H04L 41/5038* (2013.01); *H04L 43/50* (2013.01); *H04L 51/02* (2013.01); *H04L 51/14* (2013.01); *H04M 3/28* (2013.01); *H04M 3/5175* (2013.01); *H04M 3/5191* (2013.01); *H04M 7/0045* (2013.01); *H04L 41/5083* (2013.01); *H04L 41/5093* (2013.01); *H04L 67/02* (2013.01)

(58) Field of Classification Search
USPC ......................................................... 709/206
See application file for complete search history.

(56) References Cited

U.S. PATENT DOCUMENTS

| | | | |
|---|---|---|---|
| 2004/0008825 A1* | 1/2004 | Seeley | H04M 3/50 379/32.01 |
| 2007/0220487 A1* | 9/2007 | Wu | G06F 11/263 717/124 |

(Continued)

*Primary Examiner* — Amal S Zenati
(74) *Attorney, Agent, or Firm* — Brian R. Galvin; Galvin Patent Law LLC

(57) ABSTRACT

A system for automated contact center agent thick client workstation testing. The invention uses a workstation test execution manager. The workstation test execution manager acts as the interface between the client interaction software systems testing system and analyst controlled test device, executes an extensive set of robust test directive commands with underlying routines to be used to specify test conditions without the use of programming ability on the part of the analyst, uses a robust set of report item and format choice designators to allow easy selection of a range of report content and styles.

18 Claims, 10 Drawing Sheets

Related U.S. Application Data continuation-in-part of application No. 15/491,965, filed on Apr. 19, 2017, now Pat. No. 10,268,571, which is a continuation-in-part of application No. 15/083,259, filed on Mar. 28, 2016, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation of application No. 13/936,186, filed on Jul. 6, 2013, now abandoned, which is a continuation-in-part of application No. 13/936,147, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, application No. 16/392,504, which is a continuation of application No. 15/613,168, filed on Jun. 3, 2017, now Pat. No. 10,367,764, which is a continuation-in-part of application No. 15/491,965, filed on Apr. 19, 2017, now Pat. No. 10,268,571, which is a continuation-in-part of application No. 15/157,384, filed on May 17, 2016, now Pat. No. 10,230,836, which is a continuation of application No. 14/709,252, filed on May 11, 2015, now Pat. No. 9,344,556, which is a continuation of application No. 14/140,470, filed on Dec. 25, 2013, now Pat. No. 9,031,221, which is a continuation of application No. 13/936,183, filed on Jul. 6, 2013, now abandoned, which is a continuation-in-part of application No. 13/567,089, filed on Aug. 6, 2012, now abandoned, and a continuation-in-part of application No. 12/644,343, filed on Dec. 22, 2009, now Pat. No. 8,625,772, application No. 16/392,504, which is a continuation of application No. 15/613,168, filed on Jun. 3, 2017, now Pat. No. 10,367,764, which is a continuation-in-part of application No. 15/491,965, filed on Apr. 19, 2017, now Pat. No. 10,268,571, which is a continuation-in-part of application No. 15/083,259, filed on Mar. 28, 2016, which is a continuation-in-part of application No. 14/854,023, filed on Sep. 14, 2015, now abandoned, which is a continuation of application No. 14/141,424, filed on Dec. 27, 2013, now Pat. No. 9,137,184, which is a continuation-in-part of application No. 14/140,449, filed on Dec. 24, 2013, now Pat. No. 9,137,183, which is a continuation of application No. 13/936,147, filed on Jul. 6, 2013, now abandoned.

(60) Provisional application No. 62/491,252, filed on Apr. 28, 2017.

(56) References Cited

U.S. PATENT DOCUMENTS

| | | | |
|---|---|---|---|
| 2008/0189077 A1* | 8/2008 | Iijima | G06F 11/3433 702/186 |
| 2013/0246853 A1* | 9/2013 | Salame | G06F 11/3688 714/37 |

* cited by examiner

SYSTEM AND METHOD FOR AUTOMATED CONTACT CENTER AGENT WORKSTATION TESTING

CROSS-REFERENCE TO RELATED APPLICATIONS

| Application No. | Date Filed | Title |
|---|---|---|
| Current application | Herewith | SYSTEM AND METHOD FOR AUTOMATED CONTACT CENTER AGENT WORKSTATION TESTING |
| | | Is a continuation of: |
| 15/613,168 | Jun. 3, 2017 | SYSTEM AND METHOD FOR AUTOMATED CONTACT CENTER AGENT WORKSTATION TESTING |
| | | which claims the benefit of, and priority to: |
| 62/491,252 | Apr. 28, 2017 | SYSTEM AND METHOD FOR AUTOMATED CONTACT CENTER AGENT WORKSTATION TESTING |
| | | which is a continuation-in-part of: |
| 15/491,965 | Apr. 19, 2017 | SYSTEM AND METHOD FOR AUTOMATED THIN CLIENT CONTACT CENTER AGENT DESKTOP TESTING |
| | | which is a continuation-in-part of: |
| 15/083,259 | Mar. 28, 2016 | SYSTEM AND METHOD FOR AUTOMATED END-TO-END WEB INTERACTION TESTING |
| | | which is a continuation-in-part of: |
| 14/854,023 | Sep. 14, 2015 | SYSTEM AND METHOD FOR AUTOMATED CHAT TESTING |
| | | which is a continuation of: |
| 14/141,424 Issued 9,137,184 | Dec. 27, 2013 Issued date Sep. 15, 2015 | SYSTEM AND METHOD FOR AUTOMATED CHAT TESTING |
| | | which is a continuation of: |
| 13/936,186 | Jul. 6, 2013 | SYSTEM AND METHOD FOR AUTOMATED CHAT TESTING |
| | | and is also a continuation-in-part of: |
| 12/644,343 Issued 8,625,772 | Dec. 22, 2009 Issued date Jan. 7, 2014 | INTEGRATED TESTING PLATFORM FOR CONTACT CENTRES |
| | | and is also a continuation-in-part of: |
| 13/567,089 | Aug. 6, 2012 | SYSTEM AND METHOD FOR AUTOMATED ADAPTATION AND IMPROVEMENT OF SPEAKER AUTHENTICATION IN A VOICE BIOMETRIC SYSTEM ENVIRONMENT |
| | | and is also a continuation-in-part of: |
| 14/140,449 Issued 9,137,183 | Dec. 24, 2013 Issued date Sep. 15, 2015 | SYSTEM AND METHOD FOR AUTOMATED CHAT TESTING |
| | | which is a continuation of: |
| 13/936,147 | Jul. 6, 2013 | SYSTEM AND METHOD FOR AUTOMATED CHAT TESTING |
| Current application | Herewith | SYSTEM AND METHOD FOR AUTOMATED CONTACT CENTER AGENT WORKSTATION TESTING |
| | | Is a continuation of: |
| 15/613,168 | Jun. 3, 2017 | SYSTEM AND METHOD FOR AUTOMATED CONTACT CENTER AGENT WORKSTATION TESTING |
| | | which is a continuation-in-part of: |
| 15/491,965 | Apr. 19, 2017 | SYSTEM AND METHOD FOR AUTOMATED THIN CLIENT CONTACT CENTER AGENT DESKTOP TESTING |
| | | which is also a continuation-in-part of: |
| 15/157,384 | May 17, 2016 | SYSTEM AND METHOD FOR AUTOMATED VOICE QUALITY TESTING |
| | | which is a continuation of: |
| 14/709,252 Issued 9,344,556 | May 11, 2015 Issued date May 17, 2016 | SYSTEM AND METHOD FOR AUTOMATED VOICE QUALITY TESTING |
| | | which is a continuation of: |
| 14/140,470 Issued 9,031,221 | Dec. 25, 2013 Issued date May 12, 2015 | SYSTEM AND METHOD FOR AUTOMATED VOICE QUALITY TESTING |
| | | which is a continuation of: |
| 13/936,183 | Jul. 6, 2013 | SYSTEM AND METHOD FOR |

-continued

| Application No. | Date Filed | Title |
|---|---|---|
| 13/567,089 | Aug. 6, 2012 | AUTOMATED VOICE QUALITY TESTING<br>Which is a continuation-in-part of:<br>SYSTEM AND METHOD FOR<br>AUTOMATED ADAPTATION AND<br>IMPROVEMENT OF SPEAKER<br>AUTHENTICATION IN A VOICE<br>BIOMETRIC SYSTEM ENVIRONMENT<br>and is also a continuation-in-part of: |
| 12/644,343<br>Issued<br>8,625,772 | Dec. 22, 2009<br>Issued date<br>Jan. 7, 2014 | INTEGRATED TESTING PLATFORM FOR<br>CONTACT CENTRES | the entire specification of each of which is incorporated herein by reference.

BACKGROUND

Field of the Art

The disclosure relates to the field of system testing, and more particularly to the field of automated quality assurance testing of contact center agent workstation functionality.

Discussion of the State of the Art

As contact center software solutions—whether a single monolithic service or a set multiple service offerings from a number of vendors which together perform all needed tasks—have become more complex, so have systems and techniques to needed monitor and test them. It has become important to have the ability to qualify new software versions and variants on the entire range of hardware types expected to be deployed; to qualify new hardware or software combinations as they arise; and to monitor functional efficiency during events of unacceptable responsiveness under conditions mimicking the actual live usage. These types of test software, running on either dedicated equipment or on live equipment under instances of low live traffic are now available, but are currently inflexible in deployment, requiring significant preplanning and hardware resources, have little modification capability while running, lack the ability to run unobtrusively, and thus cannot be used to diagnose problems encountered during actual call center use, have inflexible result reporting abilities and require a significant amount of programming knowledge to administer.

What is needed are contact center agent workstation testing tools that are easy and flexible to deploy; that accept modifications without the use of complex procedures while running; and that have highly configurable and easily specified reporting formats and that can be deployed through a centralized gateway using simplified runtime commands instead of programming changes to the suites' source code themselves.

SUMMARY

Accordingly, the inventor has conceived and reduced to practice, a system and method for automated contact center agent workstation testing which has a single interface, does not need significant programming ability to operate, automates many types of testing and allocates resources, and pre-loads test payloads.

According to one aspect, a system for automated contact center agent workstation testing, comprising: a control portal module stored in the memory of and operating on a processor of a computing device and configured to: accept runtime commands and parameters directing the operation of an agent workstation test case; incorporate the runtime commands and parameters entered into a system resident test programming framework to produce an agent workstation test case; a test manager configured to: retrieve the agent workstation test case from the control portal module; assign each agent workstation test case interaction between a system-generated virtual contact center agent and a system-generated virtual customer to an available agent desktop; direct execution of all agent workstation test case tasks within each interaction between a system generated virtual contact center agent and a system generated virtual customer; collect pre-defined run-time data that results from execution of all agent workstation test case tasks within each interaction between a system generated virtual contact center agent and a system generated virtual customer; and an output module stored in the memory of and operating on a processor of a computing device and configured to display result data in a format pre-defined by the agent workstation test case, is disclosed.

According to another aspect, a method for automated contact center agent customer relationship manager testing, comprising the steps of: receiving test analyst directive commands and result report specifications from a human interface device using a workstation test execution manager which is stored in a memory and operating on a processor of a network-connected computing device; allocating target client interaction software system resources based upon either pre-programmed parameters stored within the workstation test execution manager or direct instruction by the analyst during test specification; running tests on target client interaction software systems based upon those analyst's directive commands using underlying programming that is pointed to by each directive command; and presenting the results data in a format best suited to study or desires of the analyst using preprogrammed specifications, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 1 is a block diagram illustrating an exemplary system architecture for a system and method for improved administrative control of automated chat and automated voice testing services, according to one aspect.

FIG. 2 is a block diagram illustrating an exemplary system for certifying desktop workstation systems of different operating system levels, hardware configurations and possibly differing software payloads prior to a full scale update of call center voice software, call center chat software, call center customer relationship management system software or when issues in performance are detected with existing software on workstations of different configuration according to one aspect.

FIG. 3 is a process flow diagram illustrating an exemplary method for certifying desktop workstation systems of different operating system levels, hardware configurations and possibly differing software payloads prior to a full scale update of call center voice software, call center chat software, call center customer relationship management system software or when issues in performance are detected with existing software on workstations of different configuration according to one aspect.

DETAILED DESCRIPTION

Figure 1:
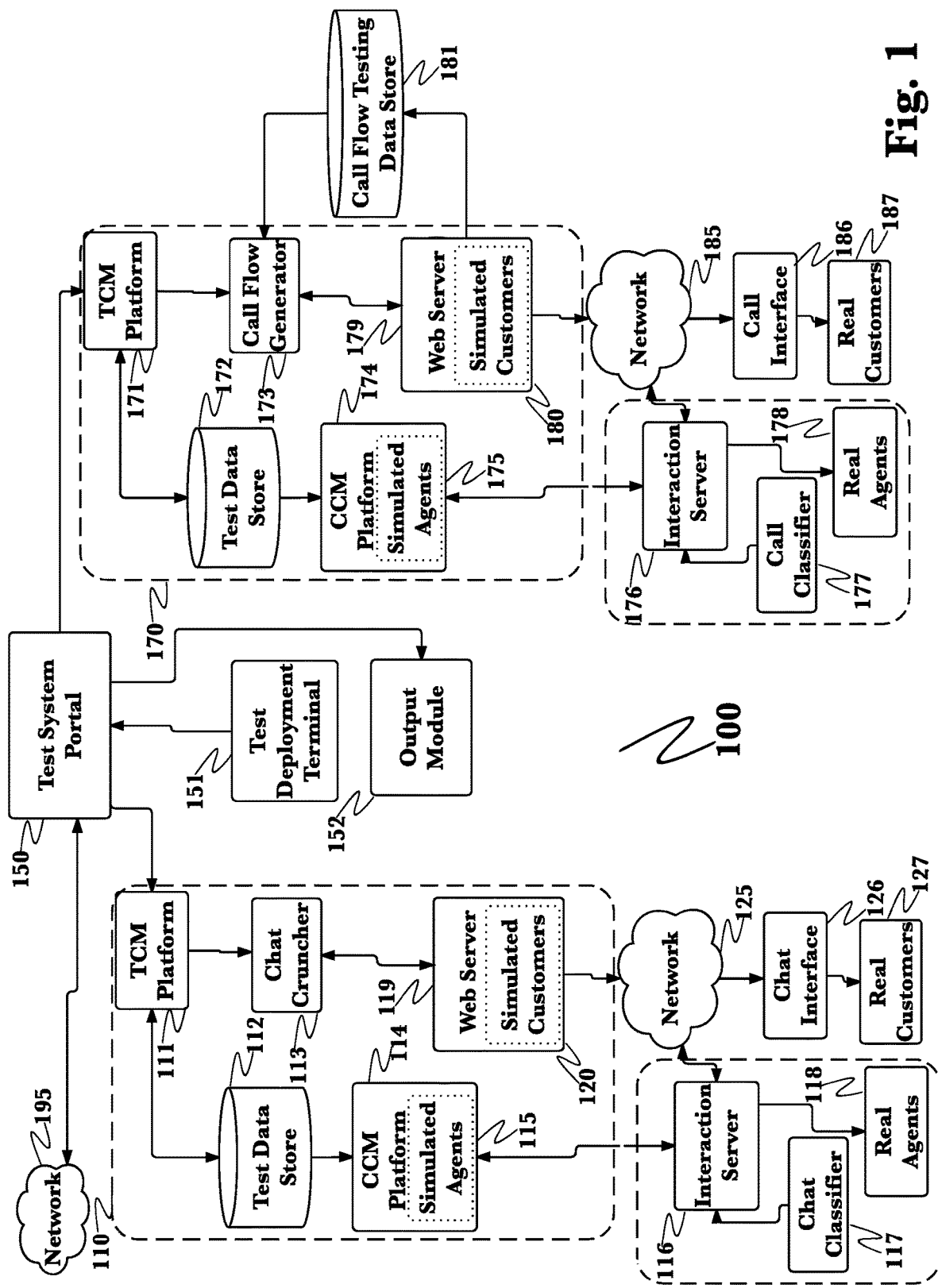

The inventor has conceived, and reduced to practice, a system and method for automated contact center agent thick client workstation testing.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the inventions, and it should be appreciated that other arrangements may be utilized and that structural, logical, software, electrical and other changes may be made without departing from the scope of the particular inventions. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for a system and method for improved administrative control of automated chat and automated voice testing services, according to one aspect. End-to-end contact center testing systems are invariably quite complex and may greatly benefit from a deployment system that allows scheduling, initiation, specification, management and allocation of resources for a wide range of analyses without the need for extensive programming knowledge on the part of the analyst. 110 is a block diagram of one aspect, illustrating a system for automated chat testing incorporating common contact center elements and running in parallel to actual contact center operations. According to the aspect, a contact center 110 may implement a test case management (TCM) platform 111, which may serve as the beginning or origin of a test case. TCM platform 111 may operate automatically or optionally may accept human interaction at a test system portal 150, in some cases via a local test control terminal with a graphical user interface 151 for manipulation of test cases using runtime commands and parameters rather than modification of test function code and viewing 152 of both interim and final test result reports which may also be stored in a testing database 112. Other arrangements may employ a networked test deployment terminal and output module (not shown) which may connect over a physical distance using a virtual private network or similar secure long distance connection. When a test is run, TCM platform 111 initiates a test case with chat cruncher 113 and contact center manager (CCM) platform 114, which may each then begin their respective automated testing processes. Chat cruncher 114 may operate a plurality of virtual customers 120 which operate via a web server 119 to simulate actual customer interaction, and may send and receive data via internet or other data communications network 125, while CCM platform 114 may similarly operate virtual contact center agents 115 which may simulate actual contact center agents and receive and respond to data requests on each of a plurality of workstations which may have differing physical specifications and third party software loads. Data requests sent by virtual customers 120 via a data network 125 may be forwarded to an interaction server 116 and requests from agents to customers via a data network 125. Interaction server 116 may verify data requests with a chat classifier 117, which may identify requests as part of a test case or actual contact center operations, to determine handling protocol as the aspect is capable of running embedded in a customer's live contact center infrastructure. If a request is determined to be a part of a test case, interaction server 116 may then proceed with test case handling. If a request is inbound from data network 125, it may be forwarded to CCM platform 114 for handling by virtual agents 115, or if it is an outbound request from a virtual agent 115 it may be sent to data network 125 for transmission to a virtual customer 120. Virtual agents 115 may operate by interacting directly with interaction server 116 or by automatically interacting with a real or simulated agent desktop environment according to the specific nature of a test case. During and/or after the execution of a test case, data may be stored in a data store 112 by CCM platform 114 or chat cruncher 113, for the formulation of test reports to be stored for later viewing by a user via TCM platform 111. In this manner it will be appreciated that the flow of data requests within a test case is bidirectional, i.e. requests may continually and asynchronously be sent from simulated customers 120 to simulated agents 115 and vice-versa, without necessitating a strict pattern or rhythm of data flow. It will be appreciated that in such a manner it is possible to simulate a customer sending multiple chat requests while an agent waits to send a response, or for an agent to send multiple requests while a customer waits. Such occurrences are commonplace in practice, and in this manner a test case may more accurately simulate actual contact center operations for more relevant and reliable testing data.

As illustrated according to the aspect, normal operations may continue uninterrupted within a contact center 110 while a test case is being performed. Customers 127 may continue to operate a chat interface 126 as normal without any impact on customer experience from a test case, sending chat requests to contact center agents 118 according to the flow illustrated. Chat requests may be sent from a chat interface 126 via a data network 125, requests may then be received and handled within a contact center. There the requests may then travel to an interaction server 116, which may then verify requests with a chat classifier 117 to determine their nature as legitimate customer interaction. Requests may then be sent to agents 118, and return requests follow an opposite path through interaction server 116, and then outward from contact center 110 via a data network 125 to a customer's chat interface 126. In this manner it will be appreciated that normal contact center operations may be running in parallel to test cases, without any impact on customer experience.

Contact center voice interaction with customers may place significantly more load on an agent's workstation as voice has a wider bandwidth to present, and there may be speech to text transcription functions to perform. There is also some pressure to provide a faster response during voice interaction which may lead to increased concurrent use of a wide range of software resources in a voice interaction environment. 170 is a block diagram of one aspect of the invention, illustrating a system for automated voice calls testing incorporating common contact center elements and running in parallel to actual contact center operations. As illustrated, a contact center 170 may implement a test case management (TCM) platform 171, which may serve as the beginning or origin of a test case. TCM platform 171 may operate automatically or optionally may accept human interaction at a test system portal 150, in some cases via a local test control terminal with a graphical user interface 151 for manipulation of test cases and viewing 152 of both interim and final test result reports which may be stored in a testing database 172. These results may be initially displayed using dashboard or carrousel type format or agent workstation and CRM client functional parameters and may include additional windows which may include, current applications open, or streaming screenshots from the test agent client to show current window activity timing. Subsequent display of specific detailed information of interest may then be available on demand. When a test is run, TCM platform 171 initiates a test case with call generator 173 and contact center manager (CCM) platform 174, which may each then begin their respective automated testing processes. Call flow generator 173 may simulate a plurality of virtual customers 180 which operate via a web server 179 and may send voice data requests pre-stored in a call flow testing data store 181. In the embodiment, all outbound and inbound voice data is transmitted through a data communications network 185 to the call interface 186 where they may be converted to PSTN transmission or may enter the internet based upon the test being run, while CCM platform 174 may similarly simulate virtual contact center agents 175 which may receive and respond to voice data requests by exercising various features of the contact center's customer relationship management software (CRM) in response to the test parameters. Data requests sent by simulated customers 180 arriving at the call interface 186 may be forwarded to an interaction server 176 and requests from agents to customers also via a call interface 186. Interaction server 176 may verify data requests with a call classifier 177, which may identify requests as part of a test case or actual contact center operations, to determine handling protocol. If a request is determined to be a part of a test case, interaction server 176 may then proceed with test case handling. If a request is inbound from call interface 186, it may be forwarded to CCM platform 174 for handling by virtual agents 175, or if it is an outbound request from a virtual agent 175 it may be sent to call interface 186 for transmission to a virtual customer 180. Virtual agents 175 may operate by interacting directly with interaction server 176 or by automatically interacting with a real or simulated agent desktop environment according to the specific nature of a test case. During and/or after the execution of a test case, data may be stored in a data store 172 by CCM platform 174 or call generator 173, for the formulation of test reports to be stored for later viewing by a user via TCM platform 171. In this manner, it will be appreciated that the flow of data requests within a test case is bidirectional, i.e. requests may continually and asynchronously be sent from simulated customers 180 to simulated agents 175 and vice-versa, without necessitating a strict pattern or rhythm of data flow. It will be appreciated that in such a manner it is possible to simulate a customer uttering multiple voice requests, requiring further CRM interaction while an agent attempts to fulfill a prior task, or for an agent to have to wait a customer produces needed data. Such occurrences are commonplace in practice, and in this manner a test case may more accurately simulate actual contact center operations for more relevant and reliable testing data.

As illustrated according to the aspect, normal operations may continue uninterrupted within a contact center 170 while a test case is being performed. Customers 177 may continue to be served through the call interface 186 as normal without any impact on customer experience from a test case, calling to contact center agents 118 according to the flow illustrated. Calls may be sent from a call interface 186, and the calls may then be received and handled within a contact center. There the requests may then travel to an interaction server 176, which may then verify requests with a chat classifier 177 to determine their nature as legitimate customer interaction. Calls from customers 187 may then be sent to agents 178, and voice responses follow an opposite path through interaction server 176, and then outward from contact center 170 via the call interface 186 to a customer 187. In this manner it will be appreciated that normal contact center operations may be running in parallel to test cases, without any impact on customer experience.

Centralized deployment of all test set-up, initiation and status review is afforded by logically connecting the test system portal 150 and user interface 151 to the TCM Platforms 111, 171 of the test system. Remote review of test status as well as review of test results is also afforded by test system portal's 190 network connection 195.

Detailed Description of Exemplary Embodiments

Figure 8:
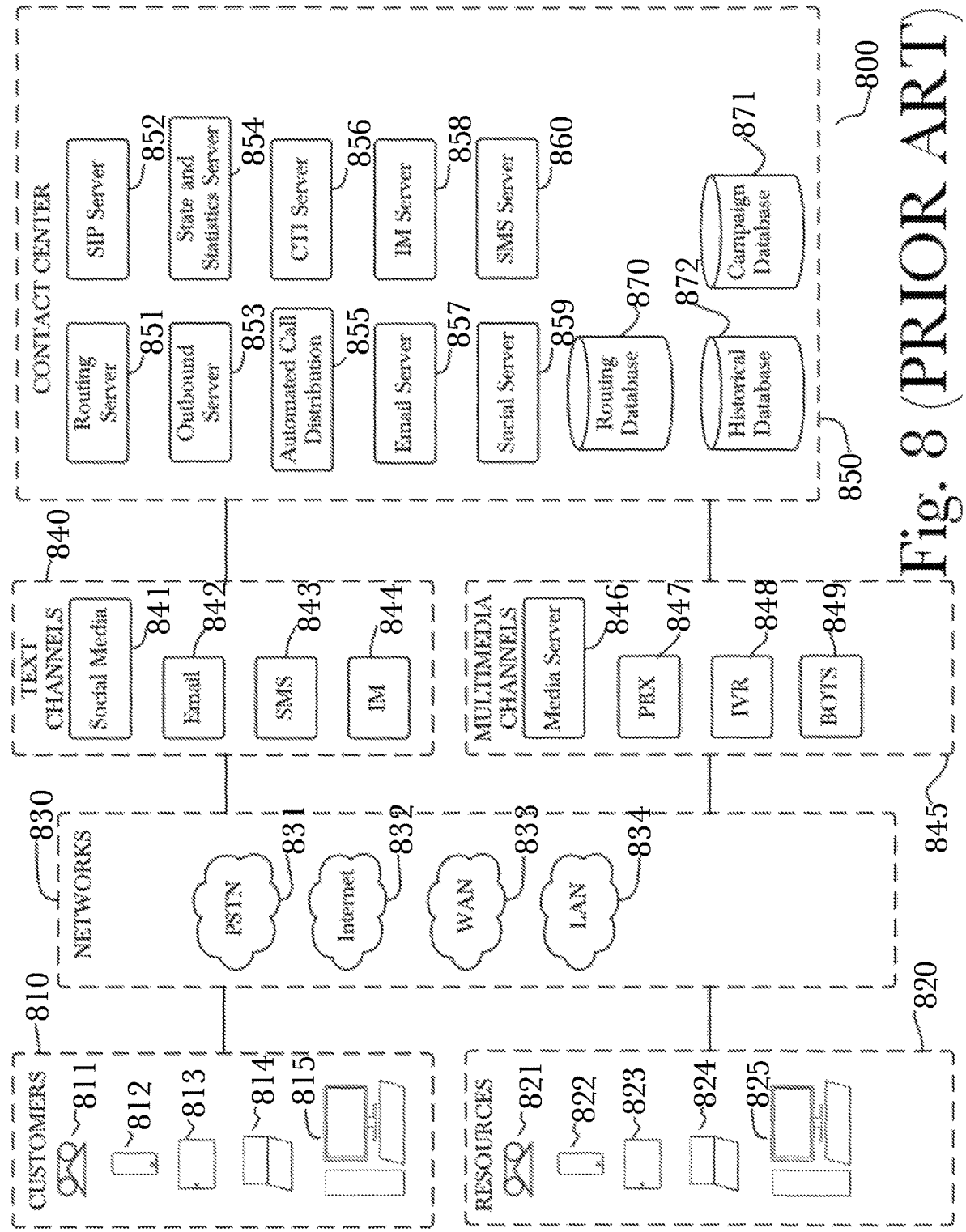
FIG. 8 (PRIOR ART) is a typical system architecture diagram of a contact center including components commonly known in the art.

FIG. 8 (PRIOR ART) is a typical system architecture diagram of a contact center 800, known to the art. A contact center is similar to a call center, but a contact center has more features. Whilst a call center only communicates by voice, a contact center adds email, text chat, and web interfaces to voice communication in order to facilitate communications between a customer endpoint 810, and a resource endpoint 820, through a network 830, by way of at least one interface, such as a text channel 840 or a multimedia channel 845 which communicates with a plurality of contact center components 850. A contact center 800 is often operated through an extensive open workspace for agents with work stations that may include a desktop computer 825 or laptop 824 for each resource 820, along with a telephone 821 connected to a telecom switch, a mobile smartphone 822, and/or a tablet 823. A contact center enterprise may be independently operated or networked with additional centers, often linked to a corporate computer network 830. Resources are often referred to as agents, but for inside sales, for example, they may be referred to as sales representatives, or in other cases they may be referred to as service representatives, or collection agents, etc. Resource devices 820 may communicate in a plurality of ways, and need not be limited to a sole communication process. Resource devices 820 may be remote or in-house in a contact center, or out-sourced to a third party, or working from home. They handle communications with customers 810 on behalf of an enterprise. Resource devices 820 may communicate by use of any known form of communication known in the art be it by a telephone 821, a mobile smartphone 822, a tablet 823, a laptop 824, or a desktop computer 825, to name a few examples. Similarly, customers 810 may communicate in a plurality of ways, and need not be limited to a sole communication process. Customer devices 810 may communicate by use of any known form of communication known in the art, be it by a telephone 811, a mobile smartphone 812, a tablet 813, a laptop 814, or a desktop computer 815, to name a few examples. Communications by telephone may transpire across different network types, such as public switched telephone networks, PSTN 831, or via an internet network 832 for Voice over Internet Protocol (VoIP) telephony. Similarly, VoIP or web-enabled calls may utilize a Wide Area Network (WAN) 833 or a Large Area Network 834 to terminate on a media server 846. Network types are provided by way of example, only, and should not be assumed to be the only types of networks used for communications. Further, resource devices 820 and customer devices 810 may communicate with each other and with backend services via networks 830. For example, a customer calling on telephone handset 811 would connect through PSTN 831 and terminate on a private branch exchange, PBX 847, which is a type of multimedia channel 845. A video call originating from a tablet 823 would connect through an internet 832, connection and terminate on a media server 846. A customer device such as a smartphone 812 would connect via a WAN 833, and terminate on an interactive voice response, IVR 848, such as in the case of a customer calling a customer support line for a bank or a utility service. Text channels 840, may comprise social media 841, email 842, SMS 843 or as another form of text chat, IM 844, and would communicate with their counterparts, each respectively being social server 859, email server 857, SMS server 860, and IM server 858. Multimedia channels 845 may comprise at least one media server 846, PBX 847, IVR 848, and/or BOTS 849. Text channels 840 and multimedia channels 845 may act as third parties to engage with outside social media services and so a social server 859 inside the contact center will be required to interact with the third party social media 841. In another example, an email server 857 would be owned by the contact center 800 and would be used to communicate with a third party email channel 842. The multimedia channels 845, such as media server 846, PBX 847, IVR 848, and BOTS 849, are typically present in an enterprise's datacenter, but could be hosted in a remote facility or in a cloud facility or in a multifunction service facility. The number of communication possibilities are vast between the number of possible resource devices 820, customer devices 810, networks 830, channels 840/845, and contact center components 850, hence the system diagram on FIG. 8 indicates connections between delineated groups rather than individual connections for clarity.

Continuing on FIG. 8 (PRIOR ART), shown to the right of text channels 840, and multimedia channels 845, are a series of contact center components 850, including servers, databases, and other key modules that may be present in a typical contact center, and may work in a black box environment, and may be used collectively in one location or may be spread over a plurality of locations, or even be cloud-based, and more than one of each component shown may be present in a single location or may be cloud-based or may be in a plurality of locations or premises. Contact center components 850, may comprise a routing server 851, a SIP server 852, an outbound server 853, a state and statistics server (also known and referred to herein as a STAT server) 854, an automated call distribution facility, ACD 855, a computer telephony integration server CTI 856, an email server 857, an IM server 858, a social server 859, a SMS server 860, a routing database 870, a historical database 872, and a campaign database 871. It is possible that other servers and databases may exist within a contact center, but in this example, the referenced components are used. Following on with the example given above, in some conditions where a single medium (such as ordinary telephone calls) is used for interactions that require routing, media server 846 may be more specifically a private branch exchange (PBX) 847, automated call distributor (ACD) 855, or similar media-specific switching system. Generally, when interactions arrive at media server 846, a route request, or a variation of a route request (for example, a SIP invite message), is sent to session initiation protocol SIP server 852, or to an equivalent system such as a computer telephony integration (CTI) server 856. A route request is a data message sent from a media-handling device such as media server 846 to a signaling system such as SIP server 852, the message comprising a request for one or more target destinations to which to send (or route, or deliver) the specific interaction with regard to which the route request was sent. SIP server 852 or its equivalent may, in some cases, carry out any required routing logic itself, or it may forward the route request message to routing server 851. Routing server 851 executes, using statistical data from state and statistics server (STAT server) 854 and (at least optionally) data from routing database 870, a routing script in response to the route request message and sends a response to media server 846 directing it to route the interaction to a specific target resource 820. In another case, routing server 851 uses historical information from a historical database 872, or real time information from campaign database 871, or both, as well as configuration information (generally available from a distributed configuration system, not shown for convenience) and information from routing database 870. STAT server 854 receives event notifications from media server 846 or SIP server 852 (or both) regarding events pertaining to a plurality of specific interactions handled by media server 846 or SIP server 852 (or both), and STAT server 854 computes one or more statistics for use in routing based on the received event notifications. Routing database 870 may of course be comprised of multiple distinct databases, either stored in one database management system or in separate database management systems. Examples of data that may normally be found in routing database 870 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 820 (which may be human agents, automated software agents, interactive voice response scripts, and so forth); data extracted from third party data sources including cloud-based data sources such as CRM and other data from Salesforce.com, credit data from Experian, consumer data from data.com; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of STAT server 854, routing database 870, campaign database 872, historical database 871, and any associated configuration systems, routing server 851 selects a routing target from among a plurality of available resource devices 820, and routing server 851 then instructs SIP server 852 to route the interaction in question to the selected resource device 820, and SIP server 852 in turn directs media server 846 to establish an appropriate connection between customer devices 810 and target resource device 820. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customer devices 810 are generally, but not necessarily, associated with human customers or users. Nevertheless, it should be understood that routing of other work or interaction types is possible, although in any case, is limited to act or change without input from a management team.

Figure 9:
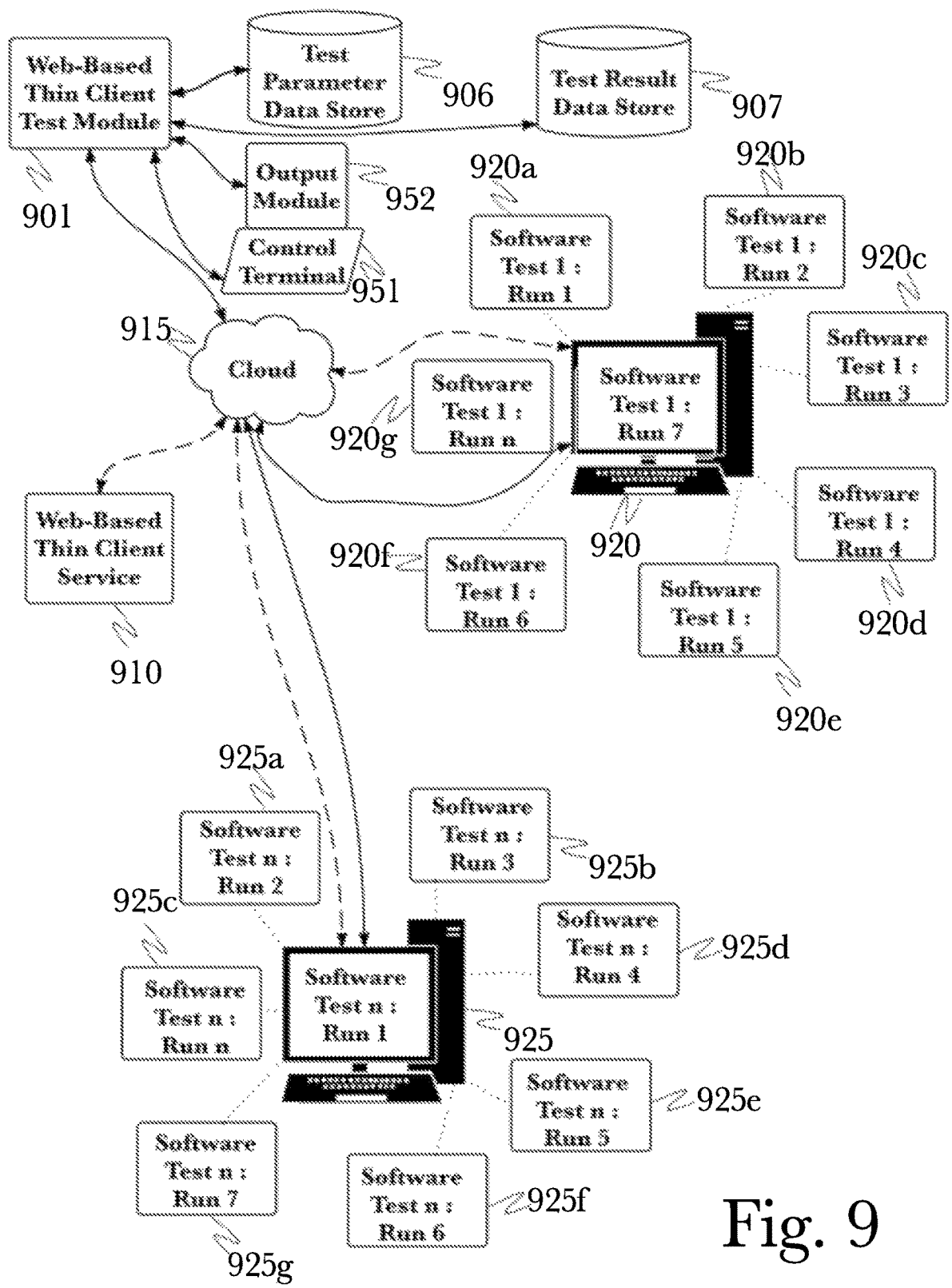
FIG. 9 is a block diagram illustrating an exemplary use of a plurality of headless web browsers to run specially-developed web versions of end-to-end voice and end-to-end chat test software as thin clients, according to one aspect.

FIG. 9 is a block diagram illustrating an exemplary use of a plurality of headless web browsers to run specially-developed web versions of end-to-end voice and end-to-end chat test software as thin clients, according to one aspect. The ability to reduce the number of software packages which must be monitored for changing hardware requirements, kept present and up-to-date in corporate workstation images and which must first be conflict as well as function tested and then deployed to workstations within a corporate department on disruption minimizing schedules has made web-browser based cloud thin clients software-as-a-service offerings 910 such as but not limited to Salesforce and its many available add-ons for use in a contact center is extremely desirable. The invention allows a central module 901 to load and monitor multiple copies of specially developed web versions of end-to-end voice system test suite, which may be run continuously to test for time dependent issues such as race conditions and memory leaks, or an end-to-end chat and call contact test suite which may run continuously for the same reasons. Test parameters may be loaded from, and stored in, a parameter database 906 and test results may be stored in a results database 907 for future reference. According to this aspect, web versions of test software and web-browser based cloud thin client software packages 910 may be loaded onto a plurality of workstations 920, 925 each running multiple instances of headless web browsers connected via network 915, as an example AWESOMIUM™ although the underlying headless web browser is not of consequence to invention function. Each of the workstations would then execute several iterations of the cloud-based thin client software of interest and the loaded thin client specialized test suite 920a-g, 925a-g. Such a configuration allows businesses to test the performance of web-browser-based, thin client workstation solutions 910, as configured at their contact centers, under a variety of incoming and outgoing test loads of both customer chat and customer voice requests using an easy to configure and modify (using control terminal 951 to direct output module 952) command and parameter interface based test suite system that runs on a compact hardware platform 920, 925. The test suite may also be used to rapidly and thoroughly determine root cause of difficulties encountered by the call center while using the particular thin client service 910 for accurate, informative defect reporting to the web-based thin client service provider without the expenditure of significant human or equipment resources. Additionally, various combinations may be utilized involving both thin clients (as described above in FIG. 9) and "thick" clients that require the installation of software that remains on a device such as an agent desktop (as described below, in FIG. 3), according to various contact center configurations or use cases. For example, it is common for a contact center to employ a number of devices configured as thin clients for certain uses such as low-intensity agent desktops, while also operating a number of more capable devices with installed software or custom configuration. Such varied arrangements may utilize testing of both thin and thick clients, according to various aspects described herein, providing a more fully-features testing configuration that can be tailored to any contact center infrastructure. Results such as, but not limited to, web browser load on workstation resources, initial customer information screen presentation, proper operation of all support functions and windows can be easily monitored through dashboard of carrousel display formats allowing rapid recognition of outlying elements both during and post test run.

Figure 10:
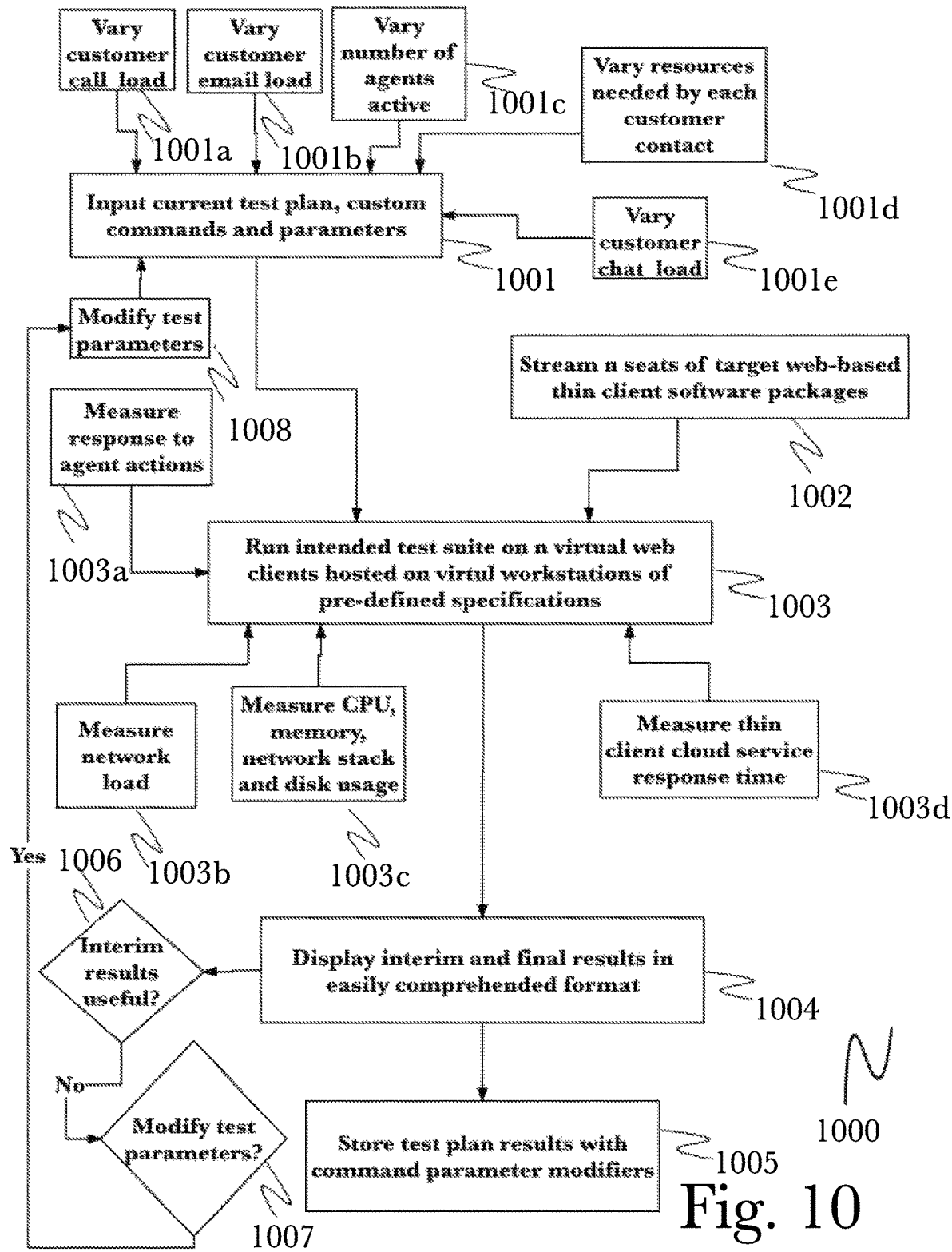
FIG. 10 is a flow diagram illustrating an exemplary method for using a plurality of headless web browsers to run specially-developed web versions of end-to-end voice and end-to-end chat test software as thin clients, according to one aspect.

FIG. 10 is a flow diagram illustrating an exemplary method 1000 for using a plurality of headless web browsers to run specially-developed web versions of end-to-end voice and end-to-end chat test software as thin clients, according to one aspect. There are several aspects of the operation of a call center that relies upon web-browser based cloud-service provided thin client workstations that may affect the overall function of that call center. Embodiments of the test suite may thus commands and parameters to be specified during set-up 1001 which direct the levels of such items as, but not limited to customer call load level 1001a, customer email load level 1001b, local system resources such as processor and memory usage 1001c, customer chat message load level 1001e, number of call center agents active (web-browser based thin client workstation instances active and accepting customer requests) and the resources which may include information windows, database accesses and softphone communication connections open, just to name a few in use per customer 1001d among other parameters known to those skilled in the art. Upon initial set-up of a test plan 1001, that test may be run using a system of servers each running a target web-browser based, cloud service thin client packages 1002 on multiple instances of headless, remotely controlled, web browsers 1003, instances possibly representing workstations with different underlying capabilities (see FIG. 9). Items reported during runtime may include proper and timely web-browser client app responses to simulated agent actions 1003a, call center network load during differing customer request profiles 1003b, resource requirements on the web-browser based thin client host workstation during varying customer request and customer service profiles 1003c and measurement of the response times of the cloud service during 24-hour cycles 1003d among other parameters known relevant to one skilled in the field. Both interim, near real time, results of these individual analyses may be displayed 1004 in an easy to rapidly recognize and comprehend format such as dashboards or carrousel formats with the ability to inspect more detailed representations available in many cases, during data acquisition 1004. Both customized commands and parameters as well as pre-designated test results may be permanently stored 1005. Stored commands and parameters 1005 may be re-called and used as a basis of subsequent tests, either as-is, or modified with novel runtime commands or parameters as needed, to make the creation of test suites simple and time efficient for analysts having little or no programming knowledge or experience. Further, if during review of interim results, the analyst determines that the results are not showing, or fully showing the desired data concerning system performance 1006, she may decide to generally modify the commands of certain sub-tests within the test plan 1007. The invention affords for such runtime changes to be quickly made simply by modifying commands and parameters within the desired sub-test and resubmitting it 1008, without loss of data from test iterations already run.

Figure 2:
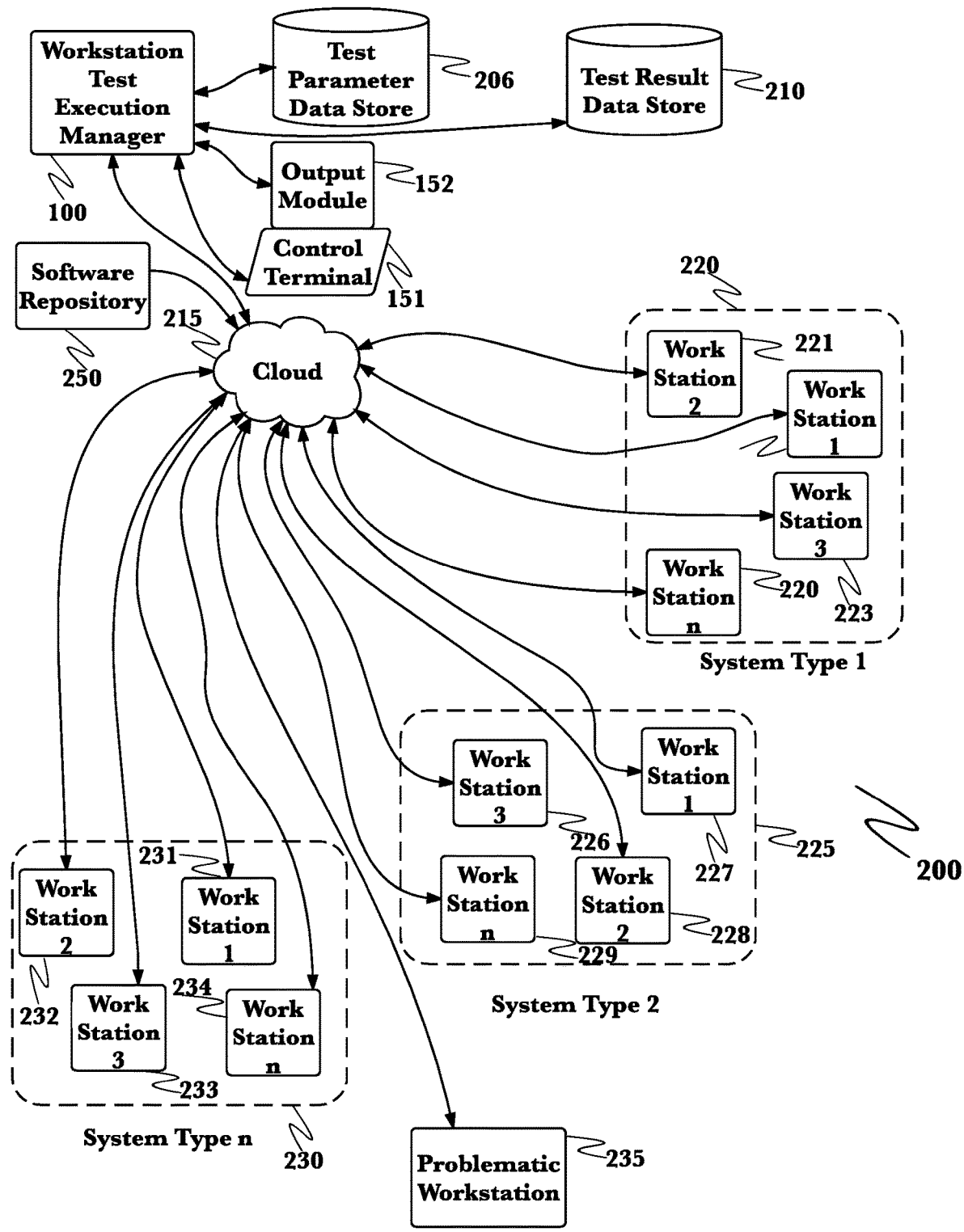

FIG. 2 is a block diagram 200 illustrating an exemplary system for certifying desktop workstation systems of different operating system levels, hardware configurations and possibly differing software payloads prior to a full scale update of call center voice software, call center chat software, call center customer relationship management system software or when issues in performance are detected with existing software on workstations of different configuration according to one aspect. When the number of workstation configurations that may be present in a contact center when accounting for just physical factors such as, but not limited to CPU, amount of RAM, network interface speed and bus speed as well as software factors such as operating system version and patch level, and the presence and version of third party software that may be used by only subgroups of agents, among other factors known to those skilled in the art, makes the availability of an easy to deploy and configure system to test new contact center software on a set of workstations in use within the contact center prior to rollout without affecting on-going contact center operations highly desirable. The aspect allows a central module 100 to load and monitor multiple copies of end-to-end voice and chat system test suite, which may be run continuously to test for time dependent issues such as race conditions and memory leaks, or an end-to-end chat and call contact test suite which may run continuously for the same reasons. In this embodiment 200 identical copies of the test software 100 and the to be tested software packages 250 may be loaded onto a plurality of workstations grouped 220, 225, 230 to reflect the range of physical and software variants present in the contact center at large. During the test, each individual workstation representative of a test group 220(221, 222, 223, 224), 225(226, 227, 228, 229), 230(231, 232, 233, 234) is individually subjected to the entered test conditions and monitored for results that may include but are not limited to CPU usage, memory usage, reaction time, proper presentation of resources such as windows dialogs and pop-up screens, error messages, unexpected interruption in the function of one or more running functions and failure to initiate required processes for proper contact center agent experience, among other factors known to those skilled in the art, as specified by pre-designated workstation test case parameters 100, 206. All results may be permanently stored 210 for future review, possibly in comparison to other test runs. Test conditions may be initially entered through a control terminal 151 connected to the workstation test execution manager 100, either directly or through a network 215. Test conditions may otherwise be retrieved from a data store 206. The invention is designed specifically so that test set-up and modification occurs through use of easily manipulated commands and command parameters which are then integrated by the system into a workstation test programming framework to produce the runtime in the workstation test execution manager 100. All test results may be monitored by analyst in the easily and quickly comprehended dashboards or display carousel formats just to name two such representations available.

When one or more workstations 235 within a call center are found to be significantly underperforming, sometimes to the point of loss of usefulness to the agents involved, or one or more workstations begin to repeatedly crash, requiring reboot or the like to return to function, manual determination of the root cause may take significant time and resources. The embodiment may also be used, simply by modifying any likely commands or command parameters to better suit the observed characteristics. The embodiment also allows running workstation tests that are possibly not performing the exact desired tasks to be stopped, modified and re-initiated without loss of already gathered results from other tasks within the test as a whole that may be running.

Figure 3:
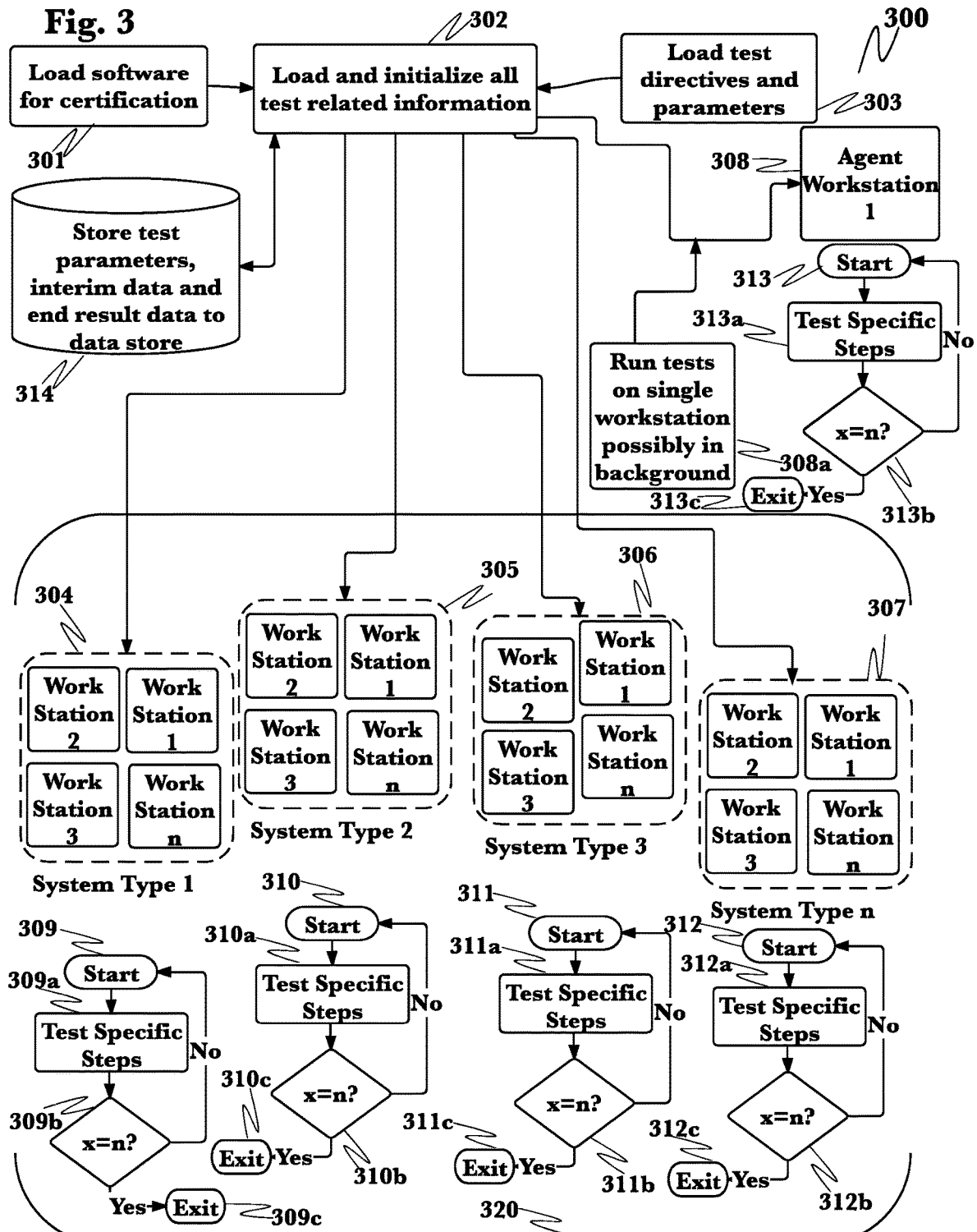

FIG. 3 is a process flow diagram illustrating an exemplary method for certifying desktop workstation systems of different operating system levels, hardware configurations and possibly differing software payloads prior to a full scale update of call center voice software, call center chat software, call center customer relationship management system software or when issues in performance are detected with existing software on workstations of different configuration according to one aspect. It is often desirable to extensively test any new software one considers placing on a large number of computer workstations which themselves may be widely heterogeneous in such important specifications as CPU installed, amount of RAM installed, operating system version, video card, and existing software payload 320, just to list a few of many factors. From a testing perspective, the ability to investigate as many functions and modes of the new software as possible over a significant length of time on multiple samples of each workstation that is of the same, or at least very similar configuration type is of great advantage. This figure depicts a flow chart 300 of such a testing construct using the workstation test execution manager as the controller hub 302 according to one possible embodiment of this process. Here, the software to be tested 301 is loaded into the workstation test execution manager 302 as are the command directives and any necessary parameters 303 that dictate how the test is to run, these parameters may include the range of operating system versions that should be included, whether or not point updates may be considered as like or different; CPUs that may be considered as like and different; the ranges of RAM that may be considered as like, the number RAM groupings desired; specific software that should be separated into have and have not groups and many other examples known to those skilled in the art, as the invention is able to identify and use any specification available remotely, including those not available when manually entered. The passage above illustrates that the workstation test execution manager can automatically set-up and run a test on workstations made available to it. Groups of workstations can also be selected by the analyst based upon existing or devised network readable identification. Once groups are created, the software to be tested is loaded, if needed, and the test cases specified in easy to manipulate runtime command directives and parameters are loaded 309, 310, 311, 312, 313 onto each of the workstations in each workstation type group. 304, 305, 306, 307. A plurality of test commands and parameters may be strung together to form macros that may represent entire test cases for one or more groups of workstation types. An analyst may then run complex test cases of an arbitrarily-large number of commands and their parameters simply by invoking a specific macro by a short token such as, but not limited to an easy to remember name or a designation on a test program progress sheet. The specific test instructions 309*a*, 310*a*, 311*a*, 312*a*, 313*a* are run a predetermined number of times per test case instructions 309*b*, 310*b*, 311*b*, 312*b*, 313*b* and the results of each iteration may be stored in a data store at the end of each round of testing 309*c*, 310*c*, 311*c*, 312*c*, 313*c* for later analysis 314. The data store 314 may store the results of testing run by the workstation test execution manager indefinitely, which allows long term regression analyses to be run over several test software versions, workstation configurations, software payload changes, network topology changes (if the tested software makes use of network protocols). These possible regression candidates are meant only as a small number of examples as the invention is able to track any characteristic pre-decided as significant.

In a slightly different arrangement, the test workstations may be chosen manually by the analyst, the test software and any other specifications loaded manually and then the workstation test execution manager configured to monitor the testing once manually started by the analyst. This also lends itself very well to instances when there a suspected slow function or other defect related to a single workstation 308 or small local grouping of workstations (not depicted) is present. An analyst can start continuous testing 308*a*, possibly passively, while the human agent assigned to the workstation performs his normal duties and the pre-configured workstation test execution manager can monitor and record the results unattended and automatically.

According to another arrangement, at least a portion of the system's robust test directive commands take one or more additional parameters which modify their function. The analyst interaction device may be a computer desktop, a tablet with special programming or other mobile device with special interface programming. At least two robust test directive commands are strung together to form more complex, customized test suites where the workstation test execution manager flags any incompatible command combinations should they arise. The workstation test execution manager is directed by the analyst to pre-load at least one planned test into hardware to be tested at a time of lesser total infrastructure use to reduce resource usage effects brought about by testing. At least one test runs within a web browser window as a web app. Several iterations of the same test may be stored to allow for retrospective analysis of efficiency changes over long periods of time.

In yet another exemplary arrangement, a combination of thin and thick clients may be tested using macros combined with browser-based testing as described above (referring to FIG. 9 and FIG. 10), for example to test various mixed arrangements within a contact center that may operate both thin and thick client devices operating as agent workstations. For example, a macro-based desktop test case may direct the operation of a separate, browser-based testing instance such as to execute a configured thin client test case, or to perform specific testing actions on a thin client as a component of a thick client test case. In another approach, a thin client test case operating via a web browser may submit requests to a thick client, triggering test case actions on that device as a component of the thin client test case. In this manner, both thick and thin clients may be tested simultaneously or interchangeably, and test cases for either may interact so as to enable various uses including (but not limited to) conditional testing wherein a test may execute pending a specific result from a previous test on a different device, or "daisy-chaining" tests wherein a test case may direct the execution of another test case, automatically driving testing forward across different devices and device types without manual interaction by an analyst or other user.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
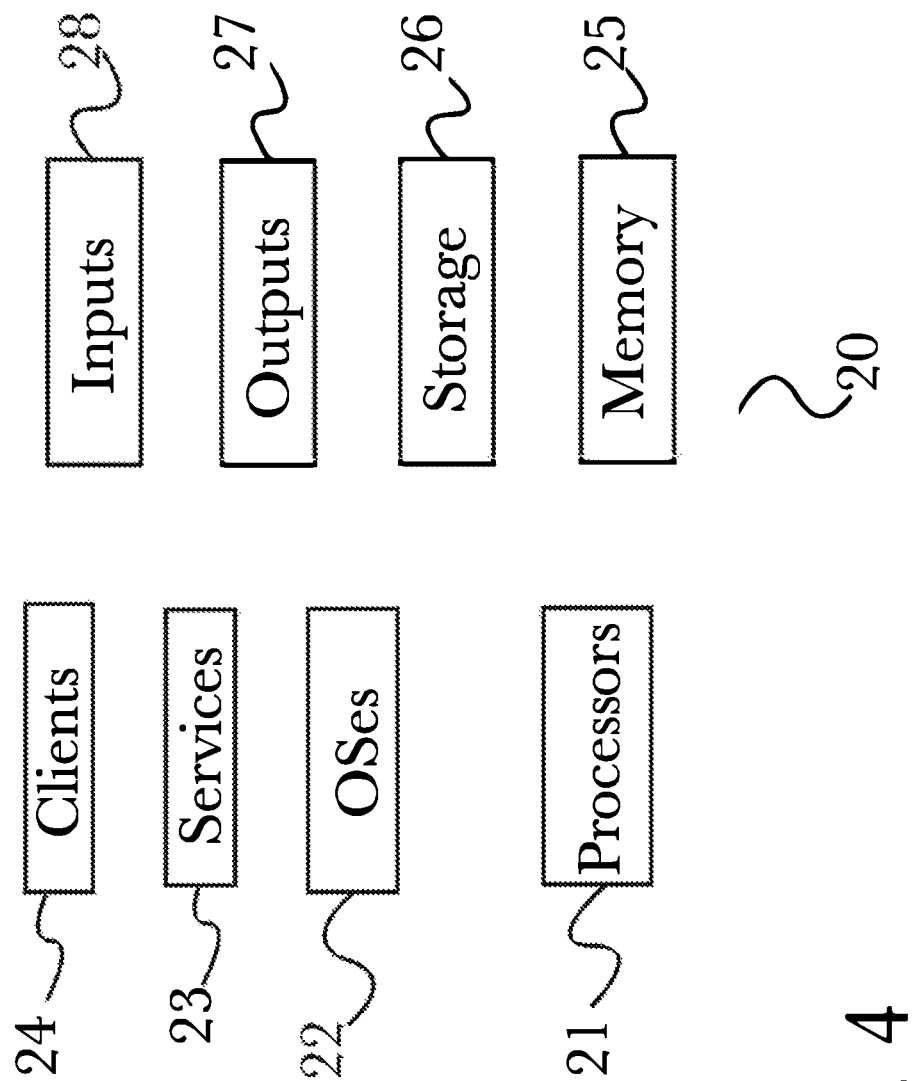
FIG. 4 is a block diagram illustrating an exemplary hardware architecture of a computing device.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
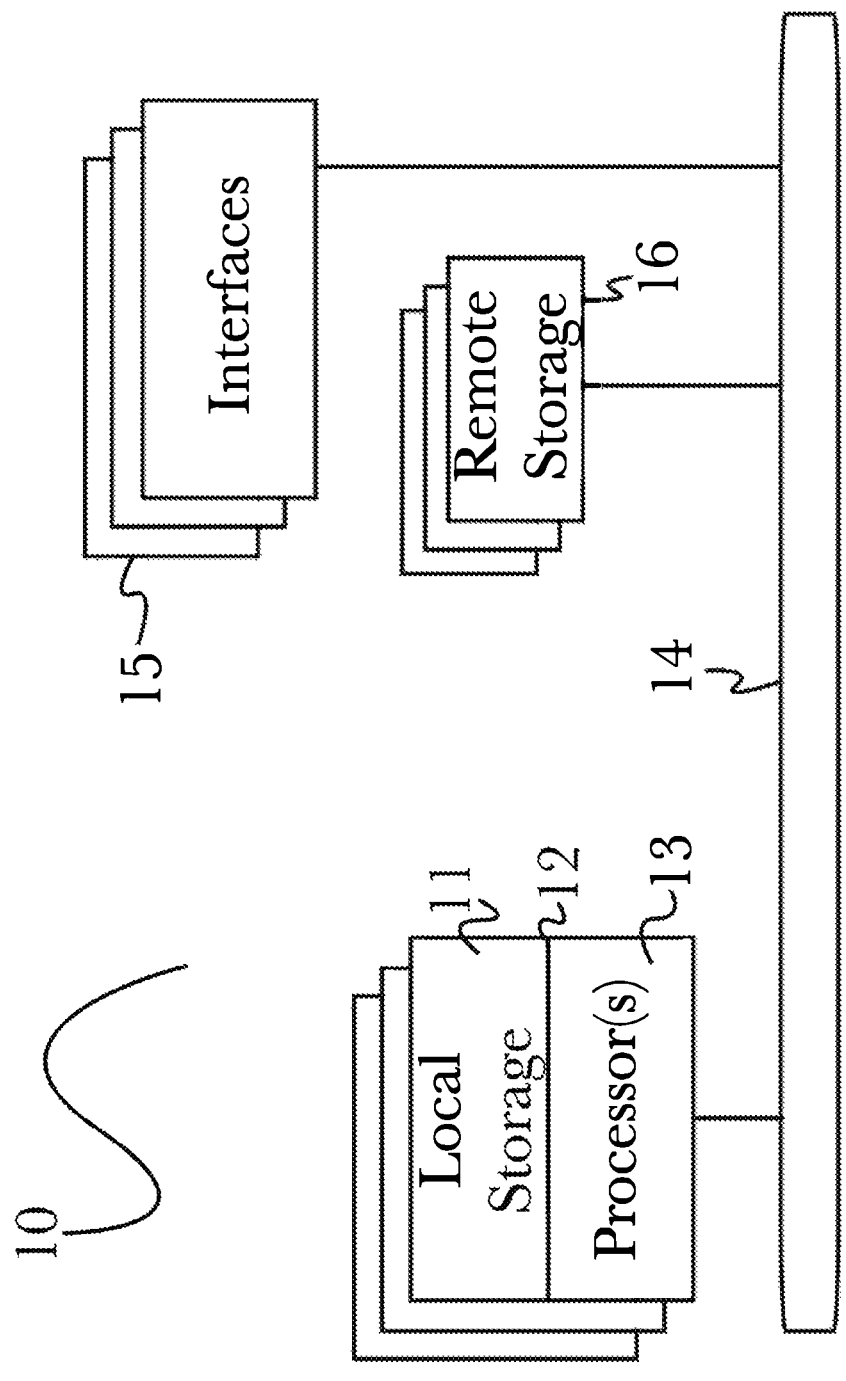
FIG. 5 is a block diagram illustrating an exemplary logical architecture for a client device.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OS X™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
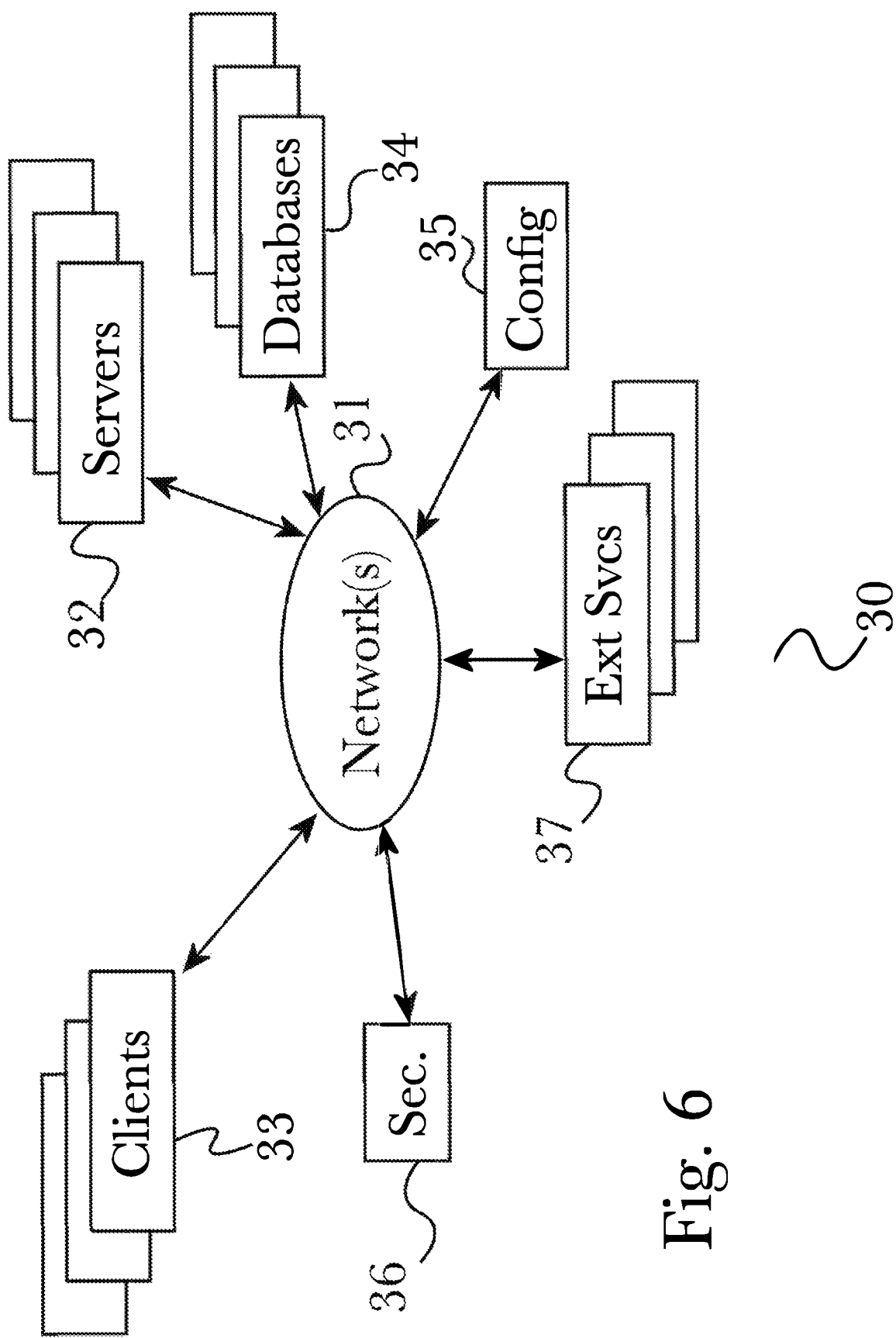
FIG. 6 is a block diagram showing an exemplary architectural arrangement of clients, servers, and external services.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
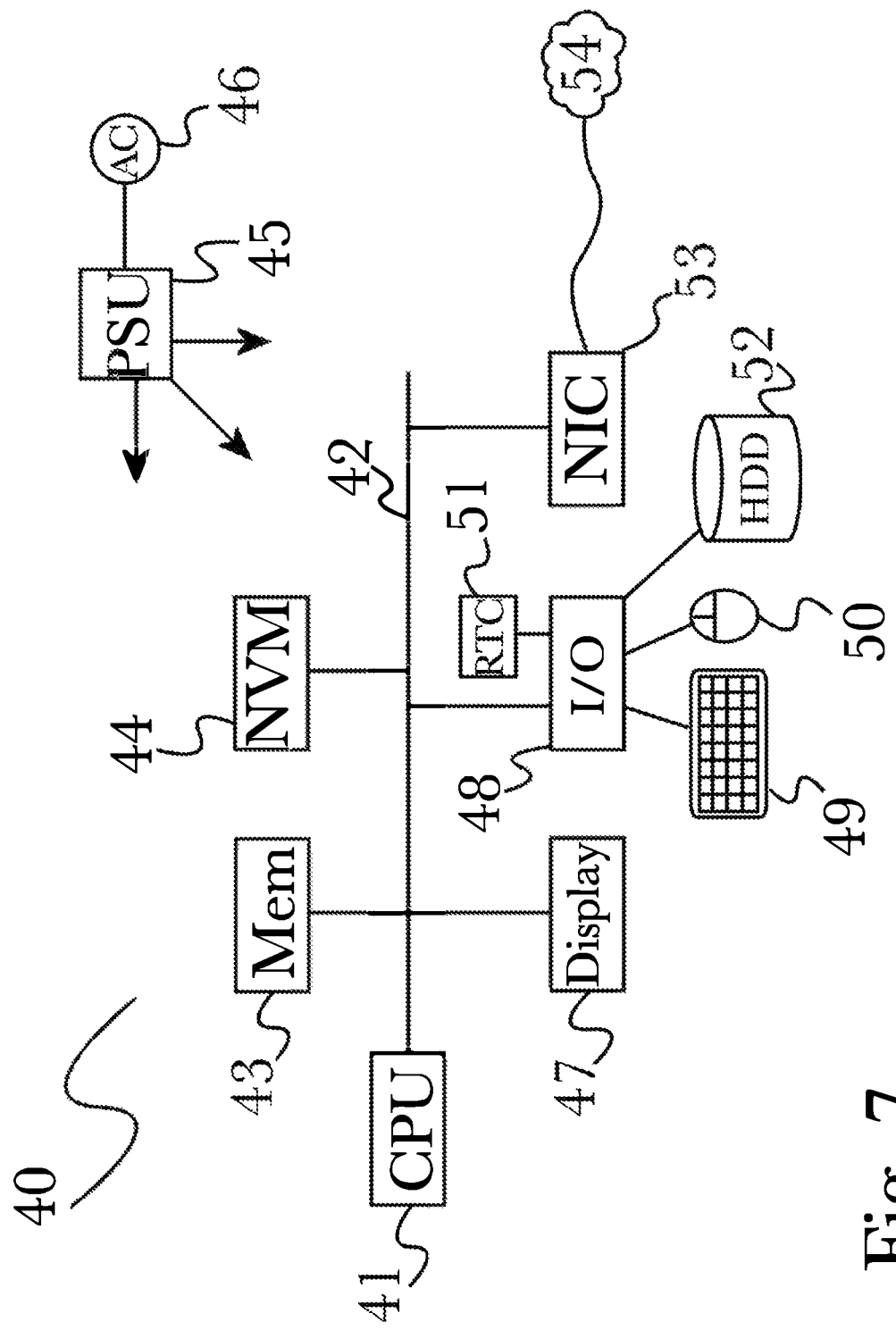
FIG. 7 is another block diagram illustrating an exemplary hardware architecture of a computing device.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for automated contact center agent workstation testing, comprising:
an agent workstation test engine comprising a plurality of programming instructions stored in the memory of and operating on a processor of a computing device, wherein the programming instructions, when operating on the processor, cause the processor to:
receive one or more input parameters, the input parameters comprising a plurality of test commands;
create an agent workstation test case using the one or more input parameters, the agent workstation test case comprising a plurality of agent-customer interactions;
instantiate a virtual contact center agent and a virtual customer;
execute the agent workstation test case on a plurality of agent workstations by implementing the plurality of agent-customer interactions between the virtual contact center agent and the virtual customer;

wherein at least two of the plurality of agent workstations have either different hardware configurations, or have different software installed, or both;

wherein at least a portion of the runtime commands and parameters come from interactive entry by an analyst using the computing device, the at least portion of the runtime commands allowing manipulation of test cases during execution of the agent workstation test case without modification of the agent workstation test case.

2. The system of claim 1, wherein the agent workstation operates as a thin client, and the interaction between a system-generated virtual contact center agent and a system-generated virtual customer is assigned to an available virtual headless web browser instance.

3. The system of claim 1, wherein the agent workstation operates as a thick client, and the interaction between a system-generated virtual contact center agent and a system-generated virtual customer is assigned to an available test execution module operating on the agent workstation.

4. The system of claim 1, wherein at least a portion of the input parameters may come from a test command and parameter data store.

5. The system of claim 1, wherein at least two test commands are combined to form more complex, customized test suites where the test control module flags any incompatible combinations should they arise.

6. The system of claim 5, wherein the at least two test commands are combined to form a command macro.

7. The system of claim 6, wherein the command macro is stored for future use.

8. The system of claim 7, wherein at least one stored command macro is graphically represented and selected by a pictogram.

9. The system of claim 1, wherein results from several iterations of at least one test is stored to allow for retrospective analysis of efficiency changes over long periods of time.

10. The system of claim 1, wherein at least one of the input parameters is graphically represented and selected by a pictogram.

11. A method for automated contact center agent workstation testing, comprising the steps of:

receiving one or more input parameters, the input parameters comprising a plurality of test commands;

creating an agent workstation test case using the one or more input parameters, the agent workstation test case comprising a plurality of agent-customer interactions;

instantiating a virtual contact center agent and a virtual customer;

executing the agent workstation test case on a plurality of agent workstations by implementing the plurality of agent-customer interactions between the virtual contact center agent and the virtual customer;

wherein at least two of the plurality of agent workstations have either different hardware configurations, or have different software installed, or both;

wherein at least a portion of the runtime commands and parameters come from interactive entry by an analyst using the computing device, the at least portion of the runtime commands allowing manipulation of test cases during execution of the agent workstation test case without modification of the agent workstation test case.

12. The method of claim 11, wherein at least a portion of the input parameters may come from a test command and parameter data store.

13. The method of claim 11, wherein at least two test commands are combined to form more complex, customized test suites where the test control module flags any incompatible combinations should they arise.

14. The method of claim 13, wherein the at least two test commands are combined to form a command macro.

15. The system of claim 14, wherein the command macro is stored for future use.

16. The system of claim 15, wherein at least one stored command macro is graphically represented and selected by a pictogram.

17. The method of claim 11, wherein results from several iterations of at least one test is stored to allow for retrospective analysis of efficiency changes over long periods of time.

18. The method of claim 11, wherein at least one of the input parameters is graphically represented and selected by a pictogram.

* * * * *